(12) United States Patent
Chang et al.

(10) Patent No.: US 10,513,058 B2
(45) Date of Patent: Dec. 24, 2019

(54) 3-D PRINTING METHOD

(71) Applicants: XYZprinting, Inc., New Taipei (TW); Kinpo Electronics, Inc., New Taipei (TW)

(72) Inventors: Cheng-Kuan Chang, New Taipei (TW); Meng-Chwen Lee, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 141 days.

(21) Appl. No.: 15/409,512

(22) Filed: Jan. 18, 2017

(65) Prior Publication Data

US 2018/0169967 A1 Jun. 21, 2018

(30) Foreign Application Priority Data

Dec. 20, 2016 (CN) .......................... 2016 1 1182185

(51) Int. Cl.
*B33Y 30/00* (2015.01)
*B33Y 50/02* (2015.01)
(Continued)

(52) U.S. Cl.
CPC .......... *B29C 35/0805* (2013.01); *B33Y 10/00* (2014.12); *B33Y 30/00* (2014.12); *B33Y 50/02* (2014.12); *B29C 2035/0827* (2013.01)

(58) Field of Classification Search
CPC ..... B29C 64/00; B29C 67/00; B29C 35/0805; B33Y 10/00; B33Y 50/02
See application file for complete search history.

(56) References Cited

U.S. PATENT DOCUMENTS 5,658,412 A * 8/1997 Retallick ............... B22F 3/1055
156/272.8
6,153,142 A * 11/2000 Chari ..................... B29C 41/46
264/308

(Continued)

FOREIGN PATENT DOCUMENTS

CN 1976800 6/2007
CN 104708817 6/2015

OTHER PUBLICATIONS

"Office Action of China Counterpart Application," dated Jul. 25, 2019, p. 1-p. 7.

*Primary Examiner* — Alison L Hindenlang
*Assistant Examiner* — Debjani Roy
(74) *Attorney, Agent, or Firm* — JCIPRNET

(57) ABSTRACT

The invention provides a 3-D printing method including: providing a liquid-state forming material in a 3-D printing apparatus; detecting a temperature of the liquid-state forming material; and adjusting corresponding curing parameters according to the temperature and curing characteristics of the liquid-state forming material to cure the liquid-state forming material layer by layer, so as to form and stack multiple cured layers to form a 3-D object. The invention can ensure consistency of a molded object printed by the 3-D printing apparatus using the liquid-state forming material and thus, solve the issue of inconsistent quality occurring to the molded object printed by the 3-D printing apparatus using the liquid-state forming material due to the curing speed of the liquid-state forming material varying with temperatures.

12 Claims, 5 Drawing Sheets

(51) Int. Cl.
    *B33Y 10/00*     (2015.01)
    *B29C 35/08*     (2006.01)

(56) References Cited

U.S. PATENT DOCUMENTS

2014/0339741 A1* 11/2014 Aghababaie ............ B29C 64/20
    264/401
2015/0165678 A1* 6/2015 Ding ...................... B33Y 30/00
    425/150

* cited by examiner

—— In the condition that the thickness of the cured layer to be formed using the the liquid-state forming material is 0.5 mm —○— In the condition that the thickness of the cured layer to be formed using the the liquid-state forming material is 0.3 mm —□— In the condition that the thickness of the cured layer to be formed using the the liquid-state forming material is 0.2 mm —◇— In the condition that the thickness of the cured layer to be formed using the the liquid-state forming material is 0.1 mm —✕— In the condition that the thickness of the cured layer to be formed using the the liquid-state forming material is 0.05 mm -------- In the condition that the thickness of the cured layer to be formed using the the liquid-state forming material is 0.025 mm

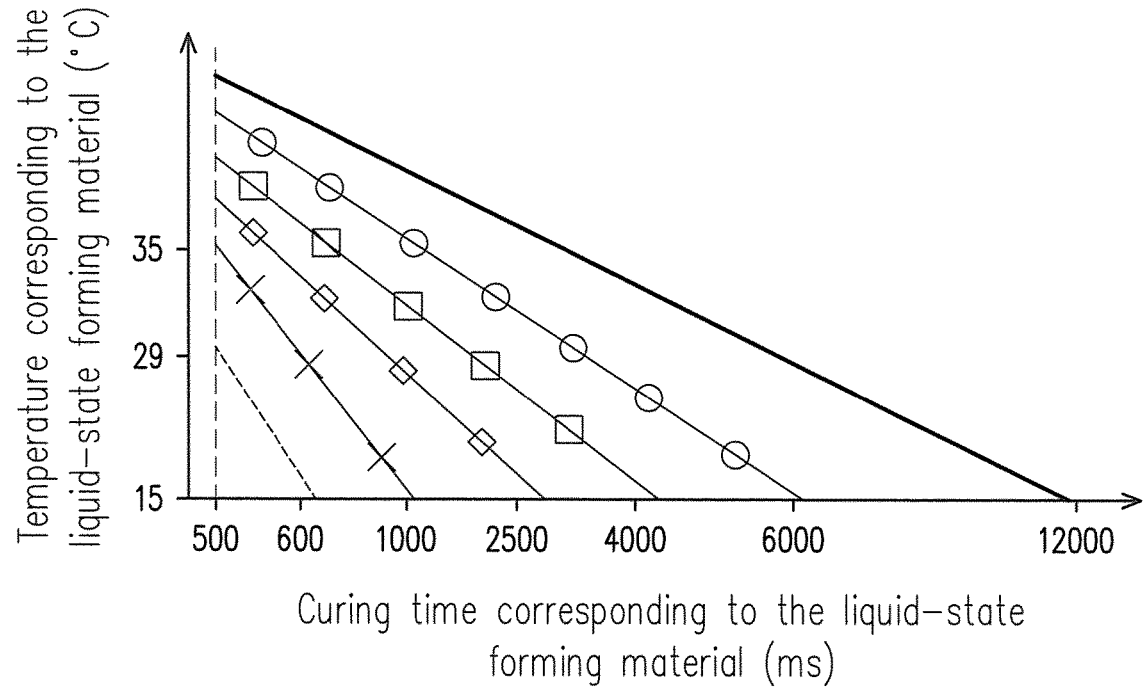

FIG. 4

―――― In the condition that the thickness of the cured layer to be formed using the the liquid-state forming material is 0.5 mm ―○― In the condition that the thickness of the cured layer to be formed using the the liquid-state forming material is 0.3 mm ―□― In the condition that the thickness of the cured layer to be formed using the the liquid-state forming material is 0.2 mm ―◇― In the condition that the thickness of the cured layer to be formed using the the liquid-state forming material is 0.1 mm ―✕― In the condition that the thickness of the cured layer to be formed using the the liquid-state forming material is 0.05 mm -------- In the condition that the thickness of the cured layer to be formed using the the liquid-state forming material is 0.025 mm

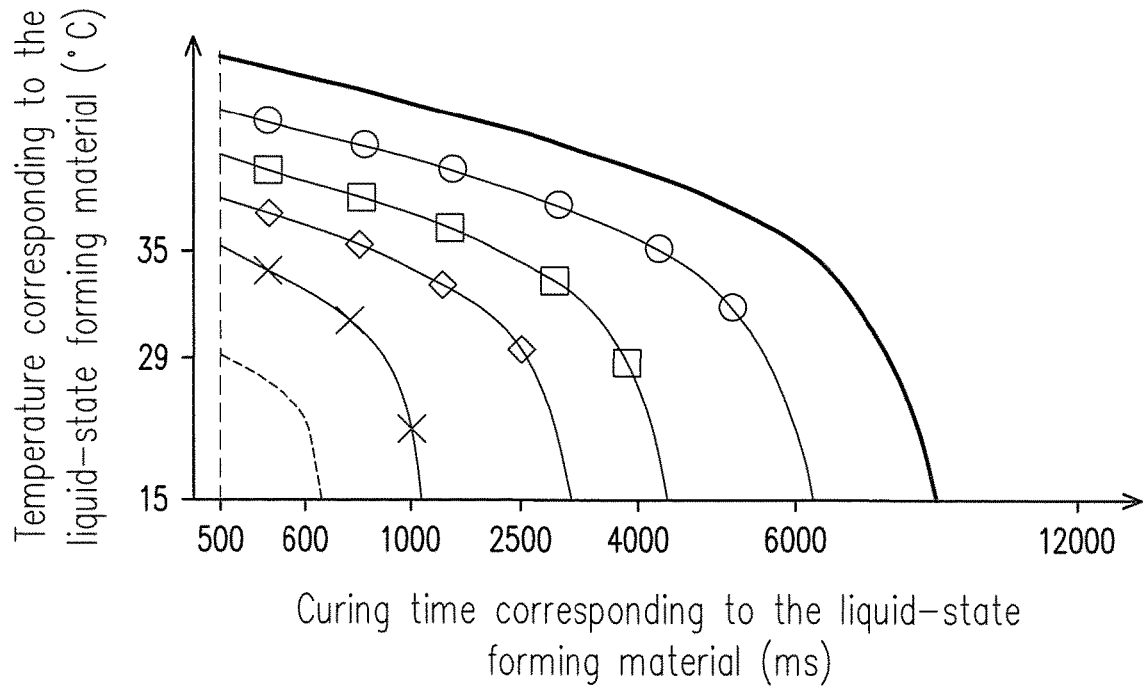

FIG. 5

3-D PRINTING METHOD

CROSS-REFERENCE TO RELATED APPLICATION

This application claims the priority benefit of China application serial no. 201611182185.8, filed on Dec. 20, 2016. The entirety of the above-mentioned patent application is hereby incorporated by reference herein and made a part of this specification.

BACKGROUND

Field

The disclosure relates to a three-dimensional printing (3-D) printing method and more particularly to a 3-D printing method for obtaining optimal curing parameters of a liquid-state forming material.

Description of Related Art

In recent years, along with progressive development of technology, many methods for constructing three-dimensional (3-D) models by using additive manufacturing technology such as layer-by-layer model constructing, have been developed. Generally, the additive manufacturing technology is to convert design data of a 3-D model constructed by software, such as computer aided design (CAD), into a plurality of continuously stacked thin (quasi two-dimensional (2D)) cross-section layers. In the meantime, many technical means to form a plurality of thin cross-section layers have been gradually proposed. For example, a printing module of a printing apparatus usually can move along an X-Y plane above a base according to XYZ spatial coordinates constructed by the design data of the 3-D model, such that a shape of the cross-section layers can be correctly formed by a constructing material. The deposited constructing material may be then naturally hardened or cured by means of heating or irradiation by a light source, so as to form the required cross-section layers. Therefore, by curing the constructing material layer by layer, the plurality of cross-section layers can be stacked along the Z axis by the printing module moving along the Z axis layer by layer, such that a 3-D structure can be formed.

Taking the technology to form the 3-D object by curing the constructing material using the light source as an example, the printing module is adapted to be soaked in a liquid-state forming material filled in a tank, and the liquid-state forming material employed as the constructing material is irradiated by the light source along the X-Y plane, such that the liquid-state forming material is cured and stacked on a forming platform of the printing module. In this way, with the forming platform of the printing module moving layer by layer along the Z axis, the liquid-state forming material is cured layer by layer and stacked to form the 3-D object.

SUMMARY

The disclosure provides a three-dimensional (3-D) printing method capable of solving an issue of inconsistent quality occurring to a molded object printed by a 3-D printing apparatus using the liquid-state forming material due to a curing speed of the liquid-state forming material varying with temperatures.

A 3-D printing method provided by the disclosure includes steps as follows. A liquid-state forming material is provided in a 3-D printing apparatus. The 3-D printing apparatus includes a tank, a forming platform, a light source, a control unit and a temperature detection unit. The tank is filled with the liquid-state forming material. The forming platform is movably disposed in the tank. The light source is disposed at the tank and used to irradiate and cure the liquid-state forming material. The temperature detection unit is coupled to the tank. The control unit is electrically connected with the forming platform, the light source and the temperature detection unit and stores curing characteristics of the liquid-state forming material. Then, a temperature of the liquid-state forming material in the tank is detected by the temperature detection unit; and curing parameters corresponding to the liquid-state forming material and the light source are adjusted by the control unit according to the temperature of the liquid-state forming material and the curing characteristics of the liquid-state forming material to cure the liquid-state forming material layer by layer, so as to form and stack a plurality of cured layers to form a 3-D object.

To sum up, the curing parameters of the liquid-state forming material are correspondingly adjusted according to the temperature and the curing characteristics of the liquid-state forming material, the invention can contribute to ensuring consistent quality of a molded object printed by the 3-D printing apparatus using the liquid-state forming material. Therefore, the issue of inconsistent quality occurring to the molded object printed by the 3-D printing apparatus using the liquid-state forming material due to the curing speed of the liquid-state forming material varying with the temperatures can be solved.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the disclosure and, together with the description, serve to explain the principles of the disclosure.

FIG. 4 is a curve graph illustrating a relative relationship between the temperatures and the curing times corresponding to different thicknesses of the cured layers according to an embodiment of the disclosure.

FIG. 5 is a curve graph illustrating a relative relationship between the temperatures and the curing times corresponding to different thicknesses of the cured layers according to another embodiment of the disclosure.

DESCRIPTION OF EMBODIMENTS

Figure 1:
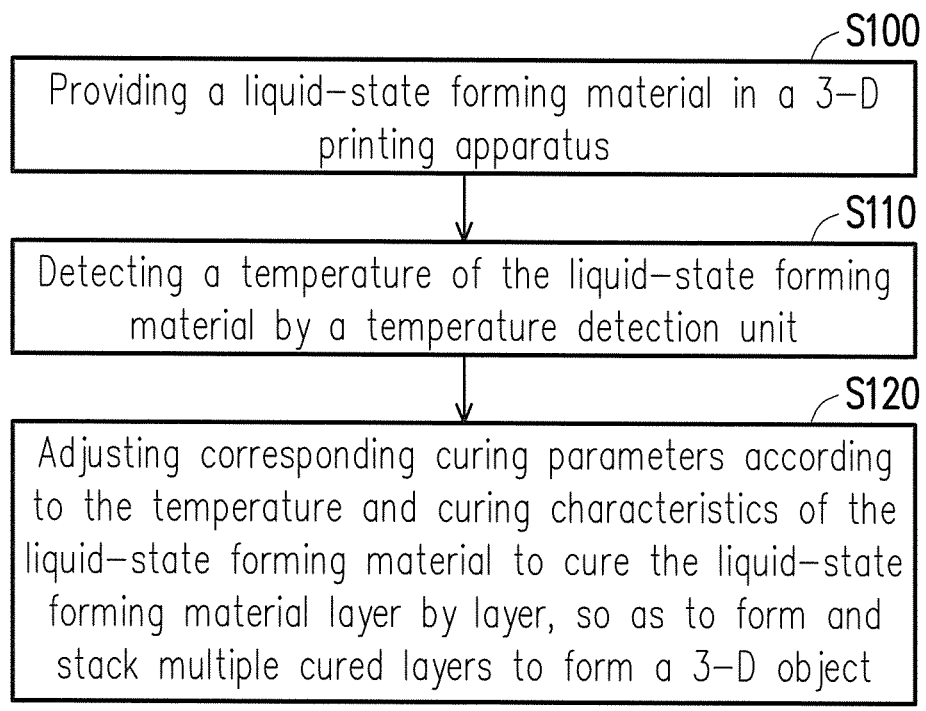
FIG. 1 is a flowchart of a three-dimensional (3-D) printing method according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 2:
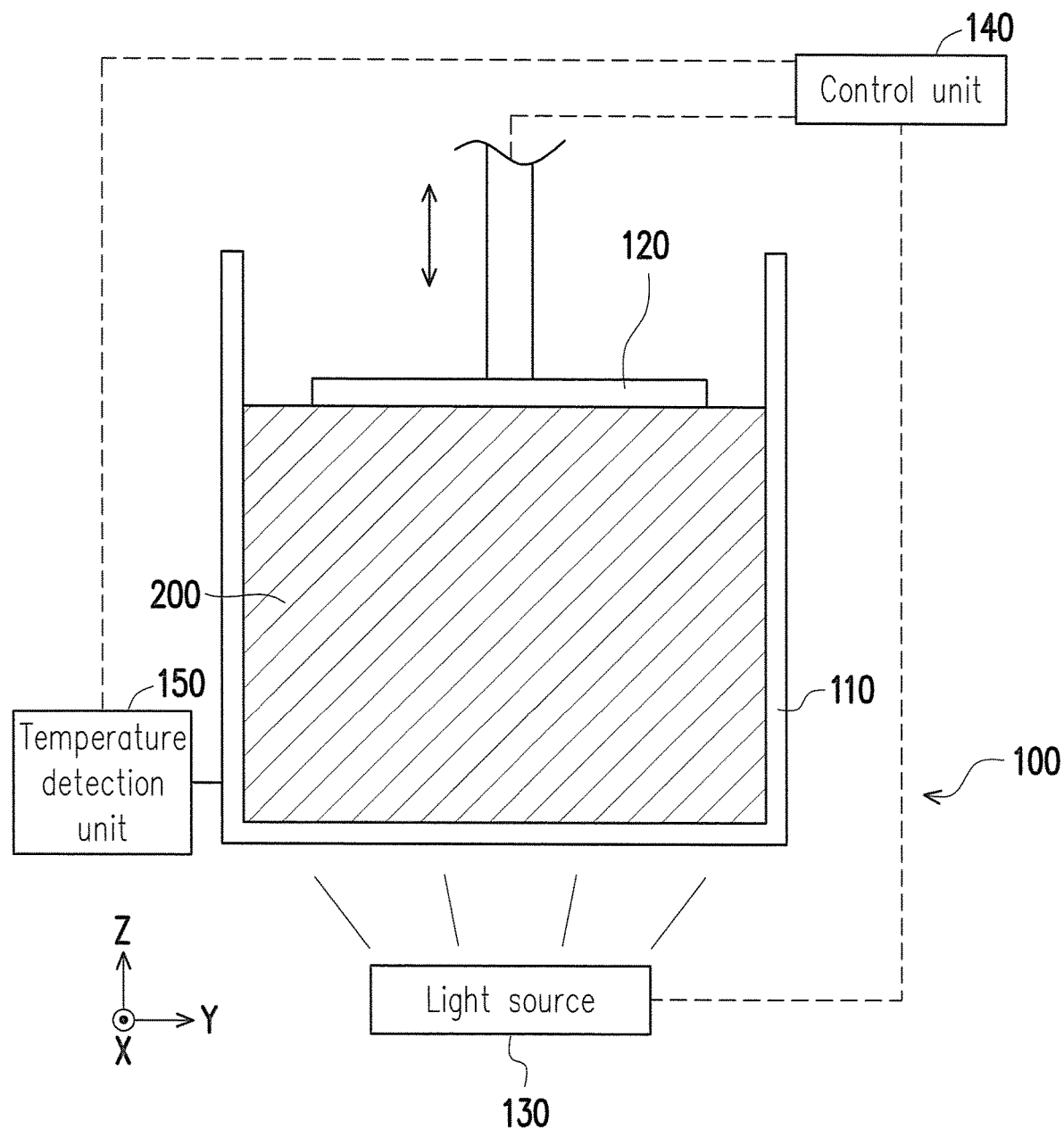
FIG. 2 is a schematic diagram of a 3-D printing apparatus according to an embodiment of the disclosure.

FIG. 1 is a flowchart of a three-dimensional (3-D) printing method according to an embodiment of the disclosure. FIG. 2 is a schematic diagram of a 3-D printing apparatus according to an embodiment of the disclosure. Referring to FIG. 1 and FIG. 2, in the meantime, spatial coordinates X-Y-Z are provided in FIG. 2 for descriptive convenience. First, in step S100, a liquid-state forming material 200 is provided in a 3-D printing apparatus. In addition, the 3-D printing apparatus is, for example, a stereo lithography (SL) apparatus 100 in the present embodiment. For example, the stereo lithography (SL) apparatus 100 of the present embodiment includes a tank 110, a forming platform 120, a light source 130, a temperature detection unit 150 and a control unit 140. The tank 110 is filled with the liquid-state forming material 200. The forming platform 120 is disposed above the tank 110 and moves relatively to the tank 110 along an axis. As illustrated in FIG. 2, the forming platform 120 moves in a direction along the Z axis to move relatively to the tank 110 on an X-Y plane and is soaked in the liquid-state forming material 200 filled in the tank 110. The light source 130 is disposed at the tank 110, for example, beneath the tank 110 and used to irradiate the liquid-state forming material 200 to cure the liquid-state forming material 200 layer by layer. The temperature detection unit 150 is coupled to the tank 110 and used to detect a temperature of the liquid-state forming material 200 in the tank 110. The control unit 140 is electrically connected with the light source 130, the temperature detection unit 150 and the forming platform 120 and used to control the movement of the forming platform 120 and the irradiation of the light source 130. The control unit 140 controls the forming platform 120 to move in the direction along the Z axis. Thereby, the forming platform 120 moves out of the tank 110 or moves in the tank 110 and is soaked in the liquid-state forming material 200. Additionally, the control unit 140 determines a curing degree of the liquid-state forming material 200 according to a position of the forming platform 120, so as to control an irradiation intensity or a scanning speed of the light source 130. For example, the forming platform 120 is controlled by the control unit 140 to be soaked in the liquid-state forming material 200 and keep a distance from an inner bottom of the tank 11. In this circumstance, the light source 130 is controlled by the control unit 140 to irradiate and cure the liquid-state forming material 200 between the forming platform 120 and the inner bottom of the tank 110, so as to form a cured layer. Namely, the aforementioned distance is a thickness of one cured layer. Thereafter, as the forming platform 120 is controlled by the control unit 140 to gradually move away from the inner bottom of the tank 110 with the light source 130 irradiating the liquid-state forming material 200 between the cured layer and the inner bottom of the tank 110, multiple cured layers are gradually stacked and formed on the forming platform 120. As such, a 3-D object formed by stacking the cured layers is completed after the forming platform 120 moves away from the liquid-state forming material 200 in the tank 110.

In step S110, a temperature of the liquid-state forming material 200 in the tank 110 is first detected by the temperature detection unit 150.

Additionally, in the present embodiment, a temperature of an environment where the 3-D printing apparatus is located is additionally measured. By measuring the temperature of the environment, accuracy of the detected temperature of the liquid-state forming material 200 may be ensured. Namely, the temperature of the liquid-state forming material 200 may be accordingly employed as reference of curing parameters of the liquid-state forming material 200 when a 3-D printing operation is subsequently performed, so as to enhance a grasp degree on 3-D printing quality.

Furthermore, the control unit 140 of the present embodiment further stores curing characteristics of the liquid-state forming material 200. In step S120, curing parameters corresponding to the liquid-state forming material 200 and the light source 130 are adjusted according to the temperature of the liquid-state forming material 200 and the curing characteristics of the liquid-state forming material 200 by the control unit 140 to cure the liquid-state forming material 200 layer by layer, so as to form and stack multiple cured layers to form a 3-D object.

Figure 3:
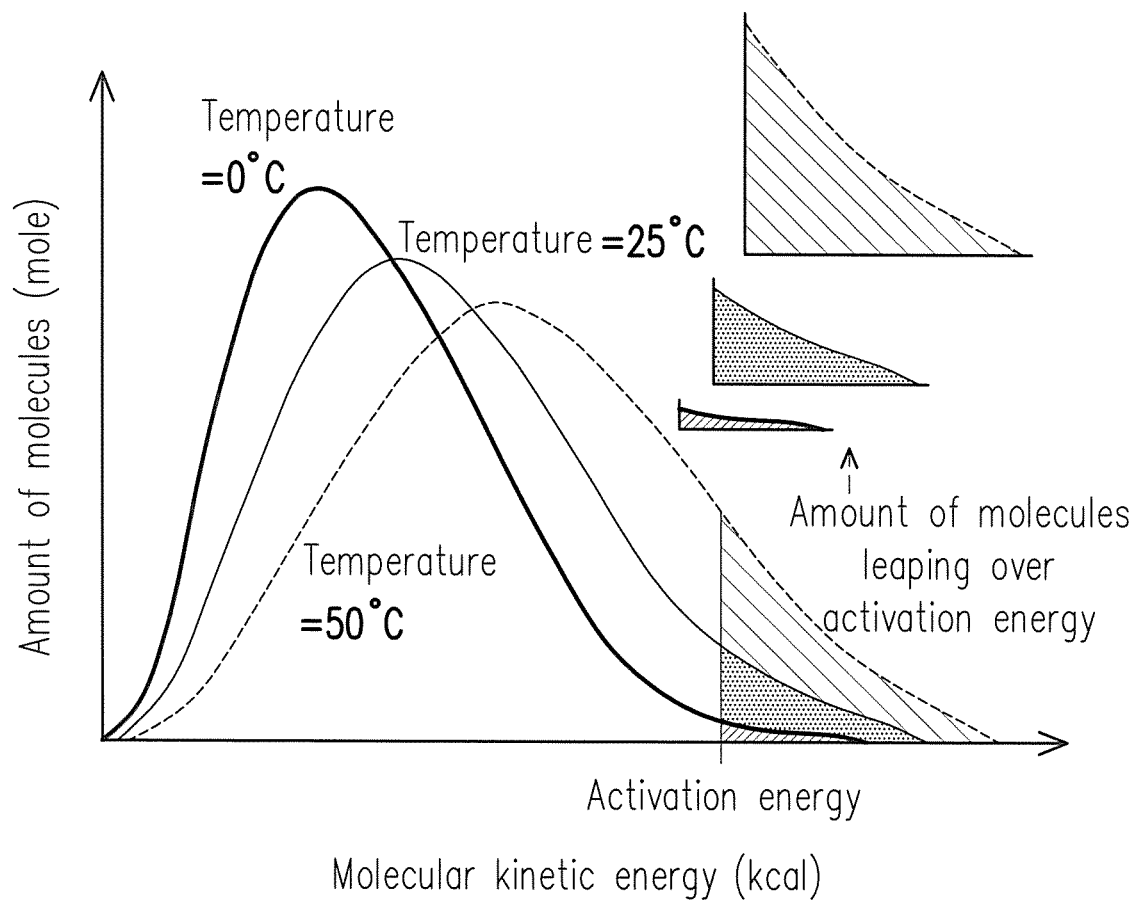
FIG. 3 is a curve graph illustrating a relative relationship between an amount of molecules of the liquid-state forming material and molecular kinetic energy at different temperatures.

The curing characteristics of the liquid-state forming material 200 include an amount of molecules possed by the liquid-state forming material 200 which are capable of leaping over activation energy at different temperatures. Referring to FIG. 3, FIG. 3 is a curve graph illustrating relative relationships between an amount of molecules of the liquid-state forming material and molecular kinetic energy at different temperatures. According to FIG. 3, the liquid-state forming material 200 has different curing speeds at different temperatures, and thus, when the temperature of the liquid-state forming material 200 increases, the amount of molecules in the liquid-state forming material 200 which have energies higher than activation energy also increases. Namely, when the temperature of the liquid-state forming material 200 increases, the amount of molecules possed by the liquid-state forming material 200 which are capable of leaping over the activation energy increases, and the curing speed of the liquid-state forming material 200 also becomes faster. In addition, according to the Arrhenius equation, i.e., $k=A*\exp(-Ea/RT)$, it may also be known that the curing speed of the liquid-state foil ling material 200 increases with the increase of the temperature. In the Arrhenius equation, k represents a reaction rate constant, A represents a frequency factor, Ea represents activation energy, R represents a universal gas constant, and T represents a reaction temperature.

The curing parameters of the liquid-state forming material 200 including a thickness of each cured layer to be formed and a curing time corresponding thereto, where the thickness of the cured layer to be formed may be, for example, determined based on a customer's demand. In the present embodiment, a relative relationship between the thickness of each cured layer to be formed by the liquid-state forming material 200 and the curing time corresponding thereto at different temperatures is illustrated in Table 1.

TABLE 1

| Thickness (mm) | Temperature (° C.) | | |
| --- | --- | --- | --- |
| | 35° C. Curing time (ms) | 29° C. Curing time (ms) | 15° C. Curing time (ms) |
| 0.025 | 300 | 500 | 600 |
| 0.05 | 500 | 800 | 1000 |
| 0.1 | 1500 | 2000 | 2500 |
| 0.2 | 3000 | 3500 | 4000 |
| 0.3 | 4000 | 5000 | 6000 |
| 0.5 | 8000 | 10000 | 12000 |

After the corresponding curing parameters are adjusted according to the temperature and the curing characteristics of the liquid-state forming material 200, a light curing process is performed on the liquid-state forming material 200. In the present embodiment, the liquid-state forming material 200 is a photosensitive resin or other adaptive light curing materials. Thus, the liquid-state forming material 200 is cured after the light curing process is performed thereon. In the present embodiment, the light curing process refers to, for example, irradiating the liquid-state forming material 200 with ultraviolet (UV) light by the light source 130, such that the liquid-state forming material 200 is polymerized under the irradiation of a certain wavelength of UV light and then cured layer by layer. After the liquid-state forming material 200 is completely cured, mutilple cured layers are formed and stacked, so as to form the 3-D object.

In an embodiment, a relative relationship between the temperatures and the curing times corresponding to different thicknesses of the cured layers to be formed using the liquid-state forming material 200 is a linear relationship, as illustrated in FIG. 4, or alternatively, in another embodiment, a relative relationship between the temperatures and the curing times corresponding to different thicknesses of the cured layers to be formed using the liquid-state forming material 200 is a quadratic-curve relationship, as illustrated in FIG. 5. As the thickness of each cured layer to be formed using the liquid-state forming material 200 and the temperature corresponding thereto are substituted in the relative relationship illustrated in FIG. 4 or FIG. 5, an optimal curing time of the liquid-state forming material 200 may be obtained. Thus, by obtaining the optimal curing times corresponding to different thicknesses of the cured layers to be formed by liquid-state forming material 200 and the temperatures, it can be ensured that the molded object printed by the 3-D printing apparatus 100 using the liquid-state forming material 200 has consistent quality.

In the present embodiment, the corresponding curing parameters are adjusted according to the temperature and the curing characteristics of the liquid-state forming material 200, so as to obtain the relative relationship between the temperatures and the curing times corresponding to different thicknesses of the cured layers to be formed using the liquid-state forming material 200, and thereby, the optimal curing times corresponding to the liquid-state forming material 200 at different temperatures are obtained in the condition that the thickness of each cured layer to be formed using liquid-state forming material 200 is determined. Accordingly, the 3-D printing method provided by the disclosure can contribute to ensuring the consistency of the quality of the molded object printed by the 3-D printing apparatus 100 using the liquid-state forming material 200. Thereby, the issue of inconsistent quality occurring to the molded object printed by the 3-D printing apparatus using the liquid-state forming material due to the curing speed of the liquid-state forming material varying with the temperatures can be solved.

It should be noted that the embodiments above are illustrated merely for the purpose of describing the disclosure, without construing limitations thereto. Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A three-dimensional (3-D) printing method, comprising:
   providing a 3-D printing apparatus, wherein the 3-D printing apparatus comprises:
      a tank;
      a forming platform, movably disposed in the tank;
      a light source, disposed at the tank;
      a temperature detection unit, coupled to the tank; and
      a control unit, electrically connected with the forming platform, the light source and the temperature detection unit, wherein curing characteristics of different liquid-state forming materials are set and stored in the control unit, and the curing characteristics of each of the different liquid-state forming materials includes a relative relationship of temperatures and curing times;
   providing at least one of the different liquid-state forming materials in the 3-D printing apparatus, wherein the at least one of the different liquid-state forming materials is filled within the tank, and the light source is used to irradiate and cure the liquid-state forming material in the the tank;
   detecting a temperature of the liquid-state forming material in the tank by the temperature detection unit; and
   adjusting curing parameters corresponding to the liquid-state forming material in the tank and the light source according to the temperature of the liquid-state forming material in the tank and the curing characteristics of the liquid-state forming materials set and stored in the control unit to cure the liquid-state forming material in the tank layer by layer, so as to form and stack a plurality of cured layers to form a 3-D object.

2. The 3-D printing method according to claim 1, wherein the curing parameters comprise a thickness of each cured layer to be formed and a curing time corresponding thereto.

3. The 3-D printing method according to claim 2, wherein the relative relationship between the temperature and the curing time of the liquid-state forming material in the tank is a linear relationship.

4. The 3-D printing method according to claim 2, wherein the relative relationship between the temperature and the curing time of the liquid-state forming material in the tank is a quadratic-curve relationship.

5. The 3-D printing method according to claim 1, wherein the liquid-state forming material in the tank comprises a photosensitive resin.

6. The 3-D printing method according to claim 1, wherein the 3-D printing apparatus is a stereo lithography (SL) apparatus.

7. The 3-D printing method according to claim 1, further comprising:
   measuring a temperature of an environment where the 3-D printing apparatus is located.

8. The 3-D printing method according to claim 1, wherein the curing time of the different liquid-state forming materials varies with the corresponding temperature thereof.

9. The 3-D printing method according to claim 1, wherein the relative relationship of temperatures and curing times includes a relative curve of temperatures and curing times.

10. The 3-D printing method according to claim 1, wherein the curing characteristics of each of the different liquid-state forming materials set and stored in the control unit further comprise an activation energy.

11. The 3-D printing method according to claim 1, wherein the curing characteristics of each of the different liquid-state forming materials set and stored in the control unit further comprise a matrix table including a temperature, a thickness, and a curing time corresponding thereof.

12. The 3-D printing method according to claim 1, after the step of detecting the temperature of the liquid-state forming material in the tank, the step of adjusting curing parameters is performed by the 3-D printing apparatus automatically.

<p style="text-align:center">* * * * *</p>